US005150130A

United States Patent [19]

Sato

[11] Patent Number: 5,150,130

[45] Date of Patent: Sep. 22, 1992

[54] LABEL PRINTER

[75] Inventor: Junichi Sato, Hasudashi, Japan

[73] Assignee: Kabushiki Kaisha Shinsei Industries, Tokyo, Japan

[21] Appl. No.: 615,455

[22] Filed: Nov. 19, 1990

[30] Foreign Application Priority Data

Dec. 14, 1989 [JP] Japan .................................. 1-324300

[51] Int. Cl.[5] ......................... G01D 15/00; B41F 1/08

[52] U.S. Cl. ................................ 346/76 PH; 346/145; 101/288

[58] Field of Search .......................... 346/76 PH, 145; 101/288

[56] References Cited

U.S. PATENT DOCUMENTS

| | | | |
|---|---|---|---|
| 4,262,591 | 4/1981 | Cook | 101/92 |
| 4,264,396 | 4/1981 | Stewart | 101/288 |
| 4,544,287 | 10/1985 | Teraoka | 346/76 PH |
| 4,641,980 | 2/1987 | Matsumoto et al. | 346/145 |
| 4,663,638 | 5/1987 | Hirose | 346/136 |
| 4,729,681 | 3/1988 | Moser | 400/613.2 |
| 4,757,329 | 7/1988 | Sato et al. | 346/76 PH |
| 4,826,558 | 5/1989 | Wada et al. | 156/384 |
| 4,830,522 | 5/1989 | Sato et al. | 400/120 |
| 5,030,968 | 7/1991 | Benson et al. | 346/145 |

FOREIGN PATENT DOCUMENTS

| | | |
|---|---|---|
| 0297568 | 1/1989 | European Pat. Off. . |
| 61-190431 | 8/1986 | Japan . |
| 62-260644 | 11/1987 | Japan . |

*Primary Examiner*—Benjamin R. Fuller
*Assistant Examiner*—Eric Frahm
*Attorney, Agent, or Firm*—Wenderoth, Lind & Ponack

[57] ABSTRACT

An extension passage for extending a label tape is horizontally provided, and a recessed label tape storage which is open at its upper side is provided for storing a roll of label tape at one end of this extension passage, a platen roller which is driven and rotated by an electric circuit is provided at the other end of the extension passage and a detector for detecting a position of a label on the label tape is provided at a middle position of the extension passage. The platen roller described above is provided to be opposed to a thermal printing head so that the thermal printing head approaches and moves away from the platen roller and this printing head is supported by a head holder which has a pivotal point at the side of the extension passage, which is entirely exposed when the head holder is vertically raised up. An openable cover for covering the head holder and the extension passage is provided above the head holder and pivoted at the side of the extension passage so that it is turned around in the same direction as the head holder.

11 Claims, 5 Drawing Sheets

LABEL PRINTER

BACKGROUND OF THE INVENTION

The present invention relates to a label printer which uses a thermal printing head such as a thermographic printing head. Conventional label printers of this type are adapted to use a label tape made up by temporarily applying a number of labels onto a carrier strip in order and carry out printing on each of these labels in sequence by a thermal printing head while feeding the label tape at a specified speed by a label tape forwarding means.

For this label printer, said label tape is wound in the shape of a roll and held by a holding means such as, for example, a winding frame, and it is drawn out to the printing position of the thermal printing head by unwinding said rolled label tape.

The thermal printing head is adapted so that said thermal printing head opposed to the platen roller and said platen roller move in a direction away from each other while said thermal printing head and said platen roller relatively approach each other and move away from each other, a space through which the label tape is passed is formed between these two devices when they are spaced apart, and said label tape is held by and between these devices when they closely approach each other and moved as the platen roller rotates while said thermal printing head carries out printing on the labels. To pass the label tape between such thermal head and platen roller, the label tape is forwarded by manual or automatic label tape feeding means in its longitudinal direction and the leading end of the label tape is guided into the space between said thermal printing head and the platen roller. A label printer with such a construction as described above is disclosed in the Patent Application Disclosure Gazette (TOKUKAI) SHO 61-190431 and Patent Application Disclosure Gazette (TOKUKAI) SHO 62-260644.

Since the conventional printer apparatuses are adapted so that the label tape is passed between the thermal printing head and the platen roller while being drawn out from the roll of label tape thus held by the holding means, there is a problem, with a label printer for which the label tape is to be manually extended, that manual extension of the label tape is troublesome and there is also a problem, with a label printer in which the label tape is extended by an automatic label tape feeding means, that the construction is complicated and the printer is more expensive. In addition, in the case of most conventional label printers, the label tape is inserted into the casing and cannot be seen from outside as disclosed in the Patent Application Disclosure Gazette (TOKUKAI) SHO 61-190431. Therefore, they have the problem that, if a trouble takes place with the label tape set in the casing, the investigation of causes and correction of the trouble will require a lot of time and efforts. In the case of the label printers in which the label tape is set to be visible from outside as disclosed in the Patent Application Disclosure Gazette (TOKUKAI) SHO 62-260644, they also have a problem that, since the label tape is often kept uprightly in the widthwise direction and guided in the passage formed by guide rollers, it will be necessary to remove takeout the label tape from the passage for inspection and also the investigation of causes and correction of the trouble will be troublesome.

SUMMARY OF THE INVENTION

An object of the present invention is to provide a label printer which has a construction capable of horizontally extending the label tape and allowing the user to observe the extension passage as a whole.

For this purpose, in the label printer in accordance with the present invention, the extension passage is formed as a flat passage which is entirely open and provided with a label tape storage for storing a roll of label tape at its one end and the platen roller which is driven and rotated by the electric circuit at its other end, and the label position detector for detecting the position of a label on the label tape is provided between this label tape storage and the platen roller. The thermal printing, head is provided above said extension passage opposed to the platen roller so that the thermal printing head approaches the platen roller from above and moves away from the platen roller and this printing head is supported by the head holder, which is pivoted at its one side, at the side of the extension passage.

Said head holder is designed to be vertically raised by turning it at least to 90° and, when the head holder is vertically raised, the printing head is vertically raised at the side of the extension passage to expose the entire label tape.

The openable cover which covers the head holder to wholly cover the extension passage is provided above said head holder and is constructed so that it is pivoted at the side end of the lateral side of the extension passage and turned in the same direction as the head holder.

Another object of the present invention is to provide a label printer which allows easy extension and setting of the label tape in the extension passage.

This object can be achieved by the construction according to the invention in which a label tape is extended in the extension passage under the condition that the entire label tape can be observed from above as described above and can be further completely achieved by a construction in which said label tape storage is a recessed chamber which is open at the upper side and a roll of label tape is set in this recessed chamber.

Another further object of the present invention is to provide a label printer which can operate only when said thermal printing head comes in complete contact under pressure with the label tape. For this purpose, the label printer in accordance with the present invention is constructed so that said head holder is provided with a compensation switch which operates to supply power to the electric circuit when said head holder turns down and the thermal printing head comes in complete contact under pressure with a label of the label tape.

DETAILED DESCRIPTION OF THE PREFERRED EMBODIMENT

Figure 1:
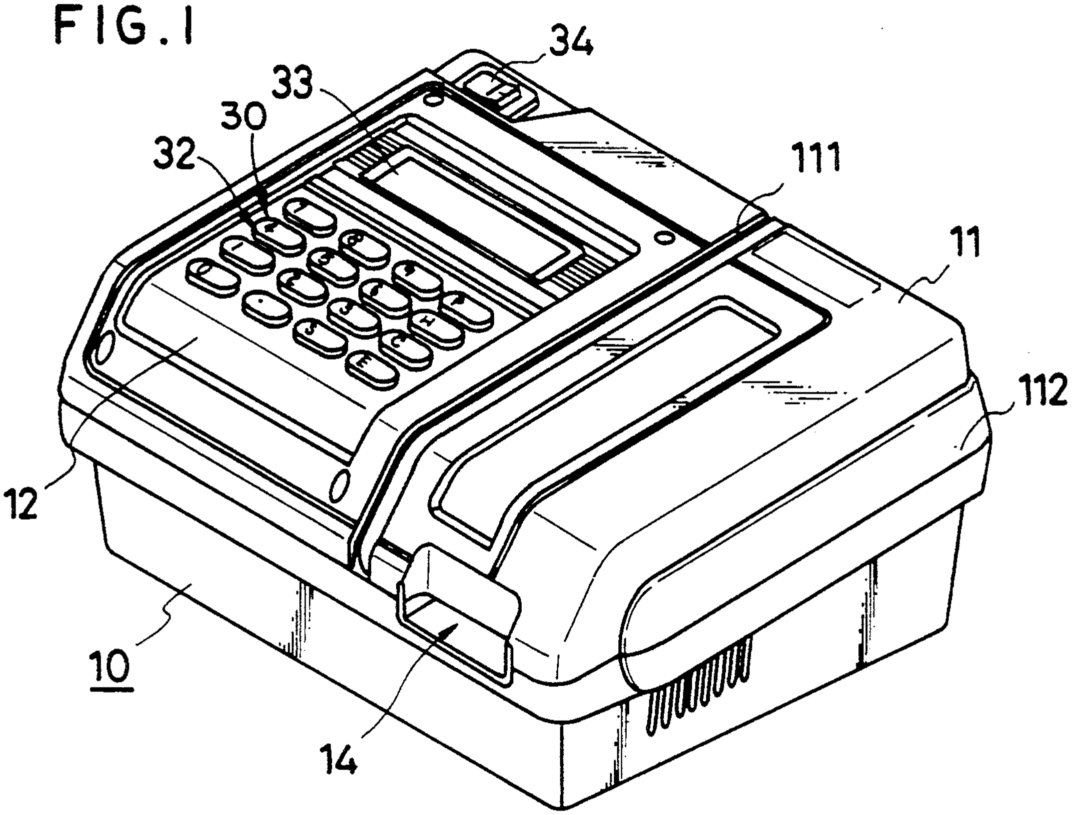
FIG. 1 is a perspective view of the label printer in accordance with the present invention with no tape in the label printer.

FIGS. 1-6 show a label printer in accordance with the present invention. In which the casing 10 is comprised of the printing section 20 and the drive section 30.

Said printing section 20 is closed with the openable cover 11 and said drive section 30 is closed with the fixed front panel 12.

Said cover 11 is adapted so that its one edge, for example, the internal edge 111 located along said drive section 30 is pivotally supported and the other edge, that is, the external edge 112 in the embodiment can be opened. Said cover 11 is also designed to be turned up to at least 90 degrees so that the printing section 20 will be entirely exposed when the cover 11 is opened as shown in FIG. 2.

The printing section 20 is provided with the thermal printing head 21, the platen roller 22 which is contacted under pressure by said thermal printing head 21, the label tape storage 23 for storing the label tape 40 and the label position detector 24 for detecting the position of a label on said label tape 40, and said thermal printing head 21 is supported by the head holder 25.

Figure 2:
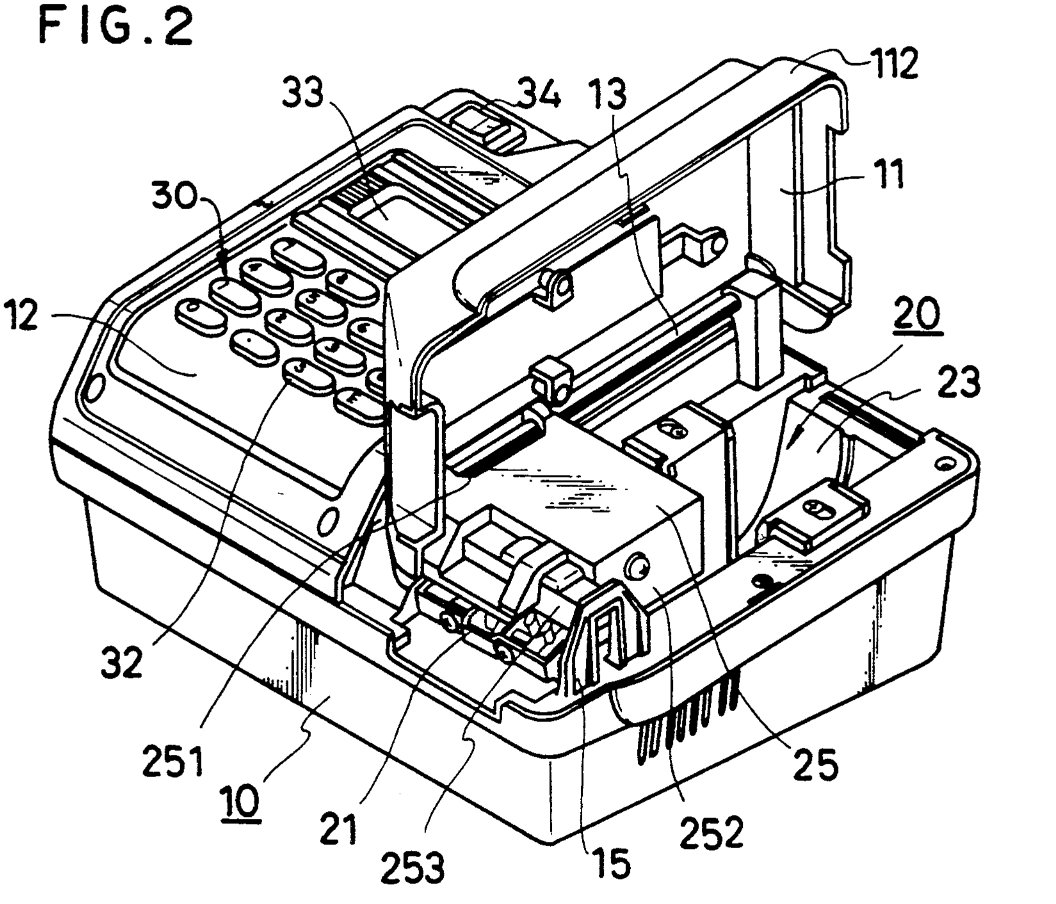
FIG. 2 is a perspective view of said label printer with the cover of said label printer opened.
Figure 3:
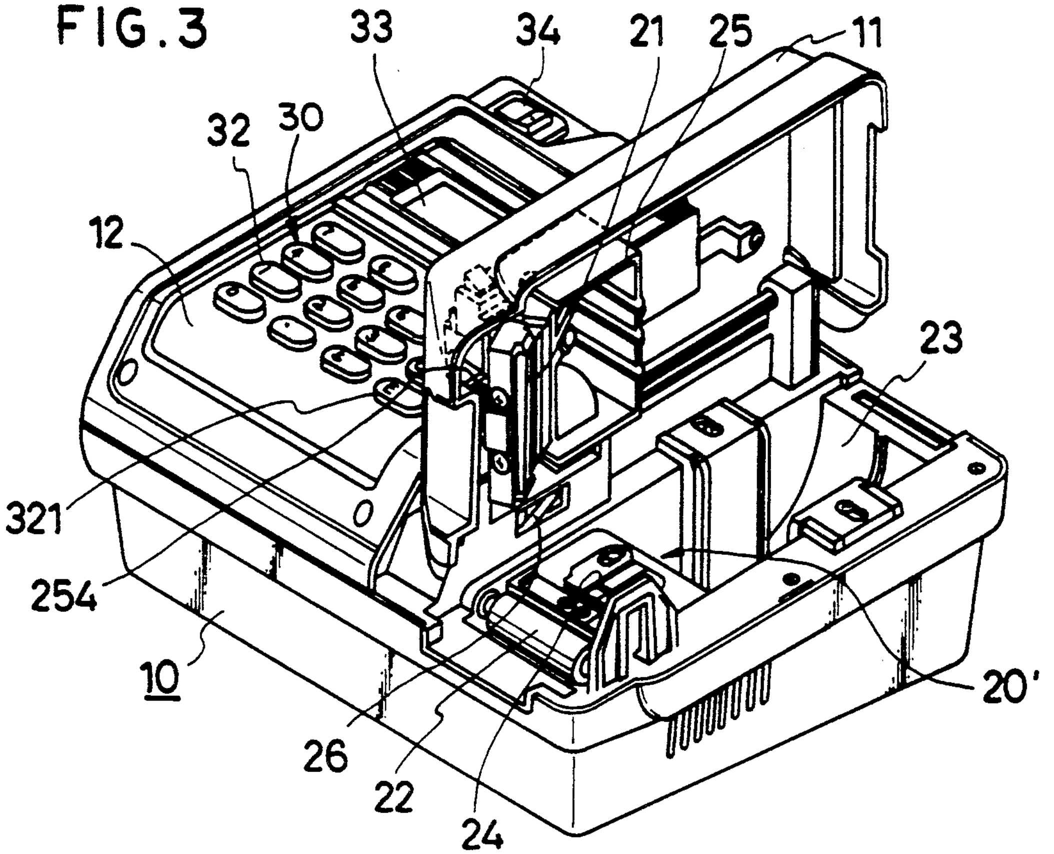
FIG. 3 is view of said label printer similar to FIG. 2 with the head holder opened.

Said head holder 25 is mounted inside said cover 11 as shown in FIGS. 2 and 3 and pivotally supported at its internal side 251 opposed to the internal edge 111 whereby its external side 252 opposing to the external edge 112 of said cover 11 is made openable.

For this purpose, said cover 11 and said head holder 25 are pivoted commonly with a single pivot 13 provided inside the casing 10 and designed so that the head holder 25 can be turned by 90 degrees or over around said pivot 13. Said thermal printing head 21 turns with said head holder 25 and is made to stand uprightly so that the extension passage for a label tape 40 is completely exposed when said head holder 25 stands uprightly as in FIG. 3.

Figure 4:
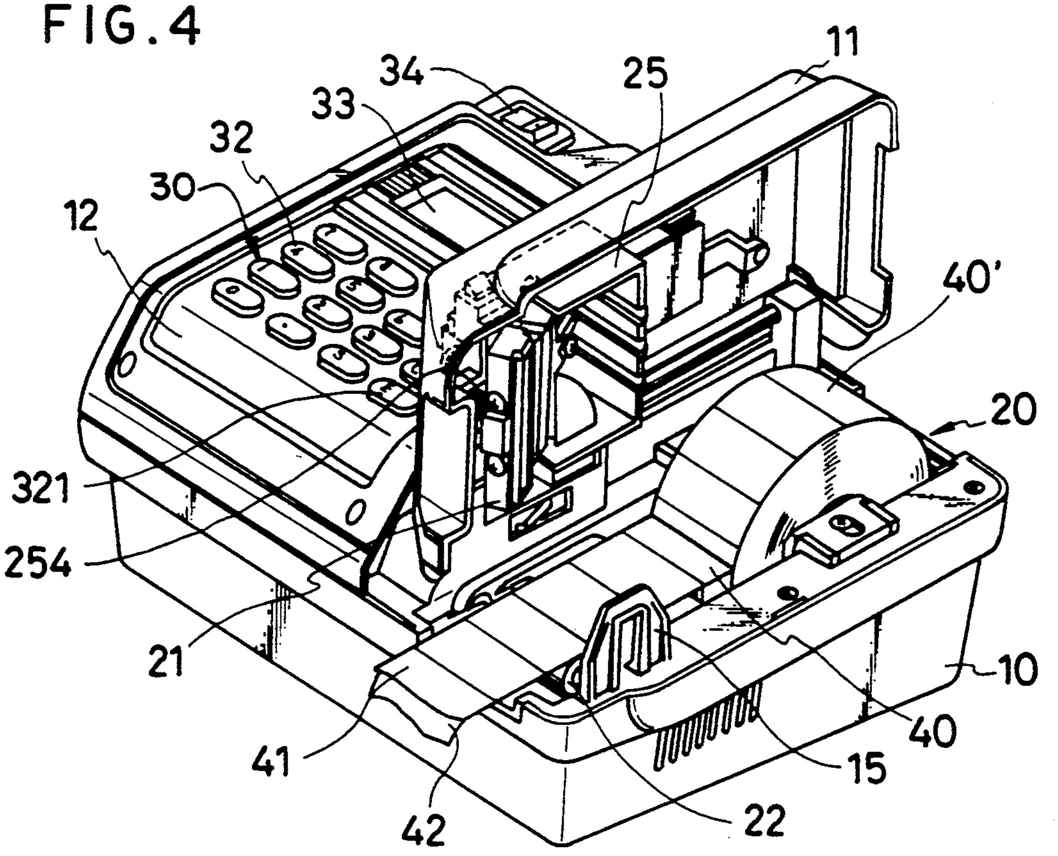
FIG. 4 is a perspective view of said label printer similar to FIG. 3 with a label tape mounted thereon.

Said platen roller 22, label tape storage 23 and label position detector 24 are arranged in linear alignment to form the extension passage 20' for the label tape 40 in the horizontal direction and the label tape 40 is wound in the shape of roll 40 and stored in the label tape storage 23 as shown in FIG. 4.

Said platen roller 22 is provided at a position where said thermal printing head 21 is able to come in contact under pressure with said platen roller 22 when said head holder turns downwardly and thermal printing by the thermal printing head 21 is carried out on labels 41 of the label tape 40 held by and between the heat-resistant surface of said platen roller 22 and the thermal printing head 21, while the label tape 40 is fed out of the casing through the feedout port 14 provided at the lower part of the cover 11 along with rotation of the platen roller 22.

Figure 7:
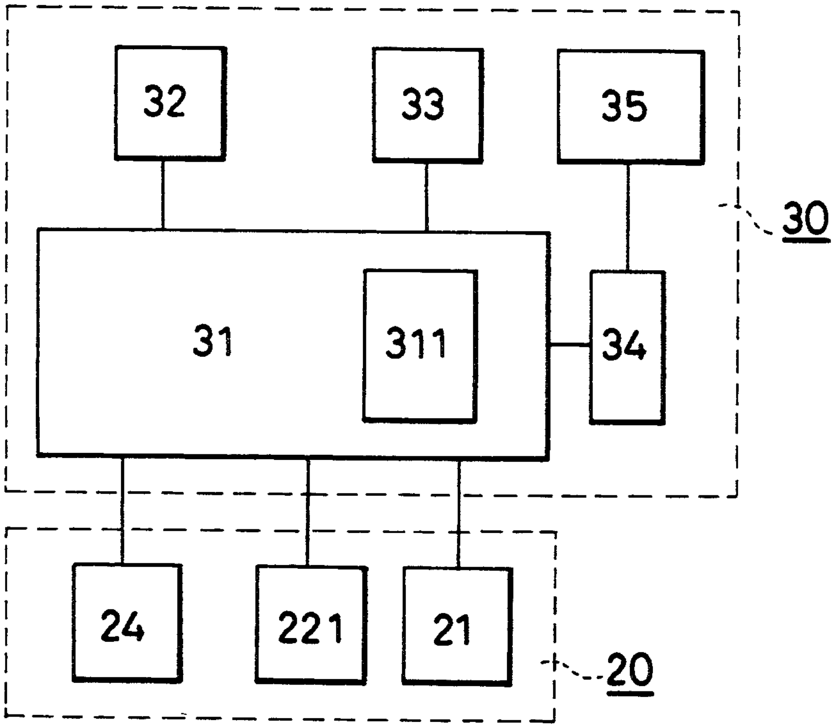
FIG. 7 is a block diagram which explains the electric circuit of said label printer.

For this purpose, said platen roller 22 is coupled to a drive means such as a stepping motor not shown, which is controlled together with the thermal printing head 21 by the electric circuit 31, see FIG. 7 in the drive section 30. Said label tape storage 23 is an upwardly-opened recessed chamber which stores said rolled label tape 40 so as to be rotatable inside this chamber and this recessed chamber is narrow and long in the direction of the extension passage so that the label tape can be drawn out from the roll 40' of label tape toward the platen roller 22.

Said label position detector 24 is provided between the platen roller 22 and the label tape storage 23 and comprises, for example, photo-electric conversion elements. For driving the label position detector 24, optical marks not shown are inscribed on the rear surface of the carrier strip 42 of said label tape 40 in connection with the positions of labels 41, and the position of label 41 in reference to the thermal printing head 21 is determined by detecting this optical mark from below the label tape by the label position detector 24. Since the drive means for said thermal printing head 21 and platen roller 22 is controlled by the electric circuit 31 as described above, a compensation switch 26 is provided to compensate the operation of the electric circuit 31. This compensation switch 26 is adapted to operate to allow supplying of current to the electric circuit 31 when said holder 25 is turned to the downward limit. In the embodiment, the compensation switch 26 is a micro switch provided at the side of the head holder 25. Said head holder 25 is provided with the slidable lock piece 253 to maintain a pressure contact state of said thermal printing head 21 with the platen roller 22. The head holder and the thermal printing head 21 are fixed by sliding this lock piece 253 to engage with the hook is which is provided on the casing 10, and the head holder 25 can be released to be upwardly turnable by sliding and disengaging the lock piece 253 from the hook 15. The thermal printing head 21 is held in the head holder 25 with the depression spring 254 to obtain a fixed contact pressure of said thermal printing head 21 on the platen roller 22.

Said drive section 30 has the electric circuit 31 and the input means such as, for example, the keyboard 32. In this case, the electric circuit 31 is similar to the one used in the printing and feeding mechanism of a conventional hand labeler and such electric circuit is disclosed, for example, in the Patent Publication Gazette SHO 58-15376.

Said keyboard 32 is provided on the front panel 12 of said casing 10 and printing data entered by this keyboard 32 is displayed on, for example, the liquid crystal display 33. The start switch 321 is provided on the keyboard 32 to operate the electric circuit 31, and the main switch 34 is provided between the internal power supply provided in the drive section 30 and an external power supply connected to the drive section 30 and said electric circuit 31 and connected in series with, for example, said compensation switch 26.

Said electric circuit 31 is typically formed with a microprocessor 311 as shown in FIG. 7, and RAM and ROM cards which are freely insertable into the electric circuit 31 can be used as said input means.

Such input means is disclosed in, for example, the Utility Model Application Disclosure Gazette (TOKUKAI) SHO 63-1710. The power supply is denoted by numeral 35 in FIG. 7. It is preferable that this power supply 35 by a power supply unit constituted by a rechargeable battery or an AC/DC converter unit which incorporates an AC/DC converter to be connected to which units the commercial mains power can be selectively used as required. For this purpose, the casing 10 is preferably provided with a chamber capable of accommodating either said power supply unit or the AC/DC converter unit.

The drive means for driving the platen roller 22 of said printing section 20 is denoted with numeral 221 in FIG. 7 and this drive means 221 is operated simultaneously with the thermal printing head 21.

Figure 8:
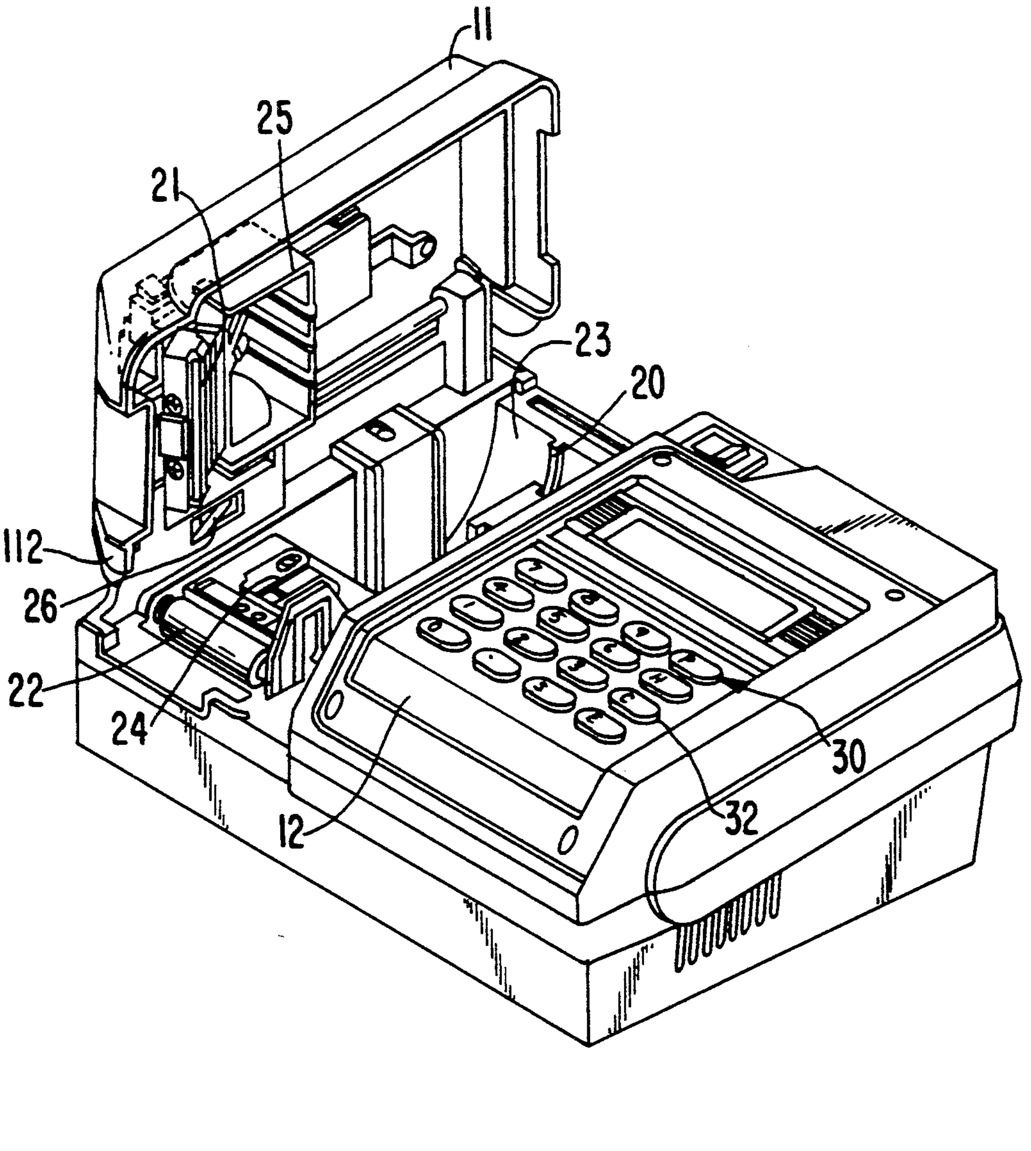
FIG. 8 is a view similar to FIG. 3 of the preferred embodiment.

In the above description, said cover 11 can be pivoted at its external edge 112 and, in this case, said head holder 25 is pivoted at its external side as shown in FIG. 8.

Figure 5:
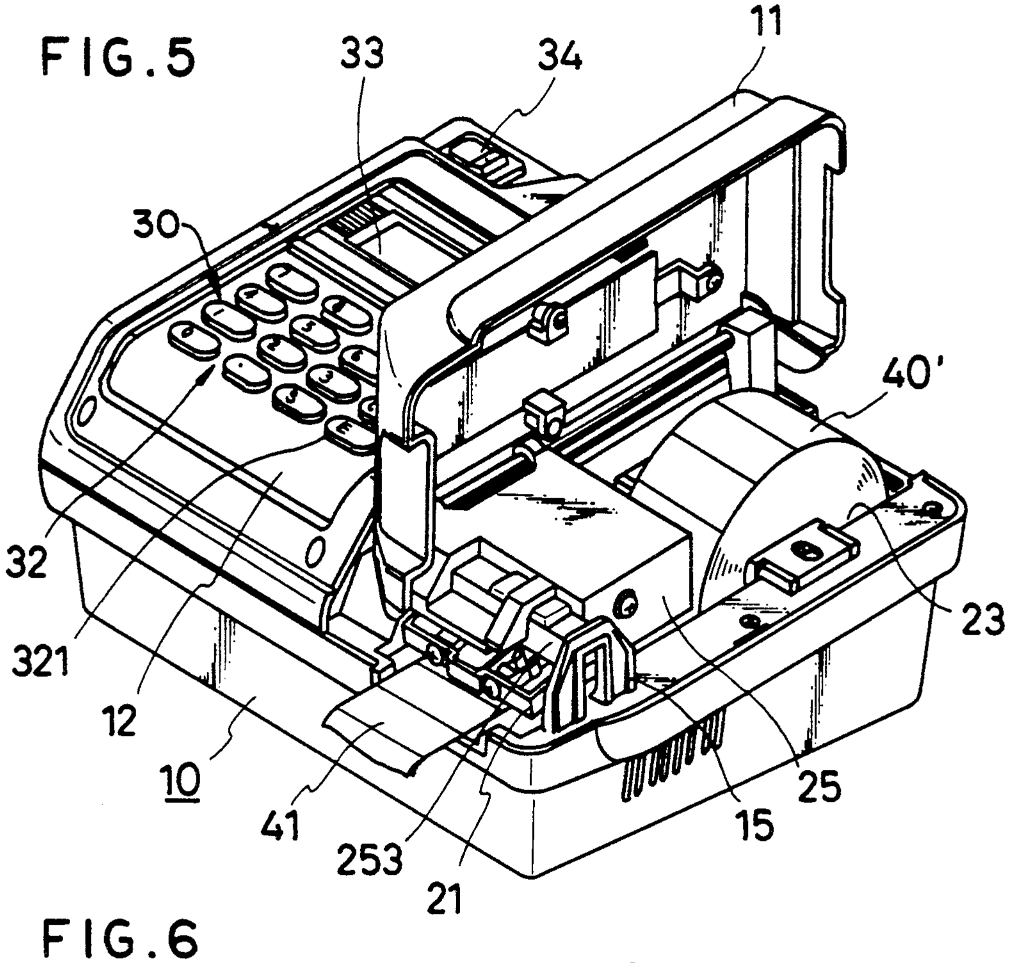
FIG. 5 is a perspective view of said label printer similar to FIG. 4 with said head holder closed.
Figure 6:
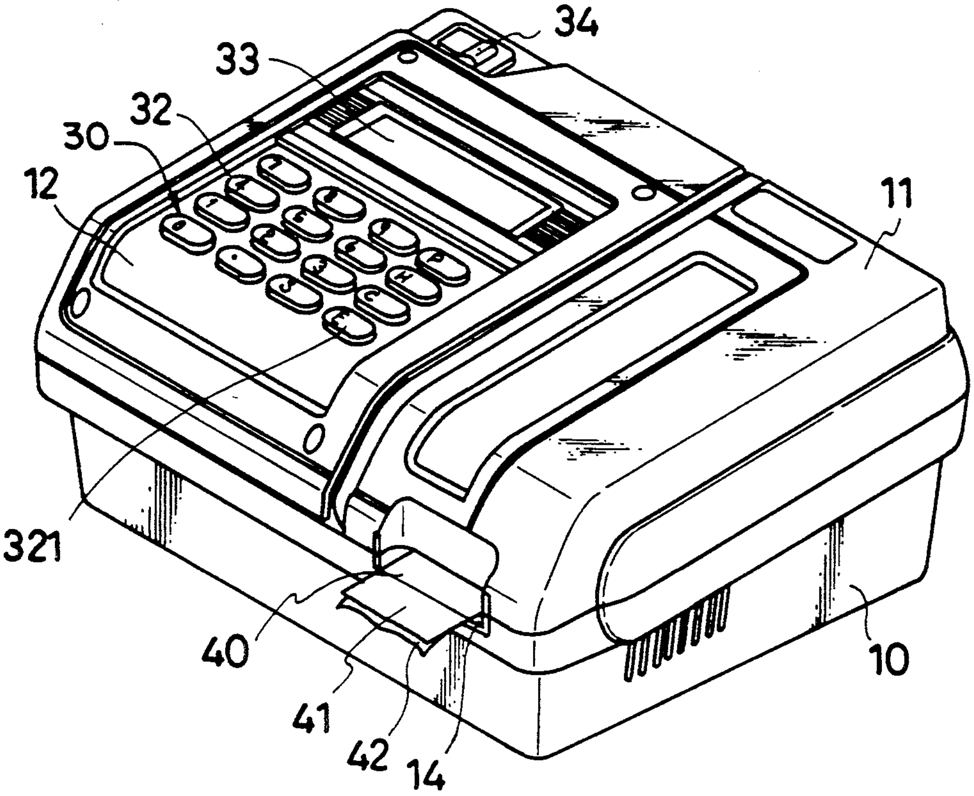
FIG. 6 is a perspective view of said label printer ready to be used.

The label printer in accordance with the present invention is as described above. The cover 11 of casing 10 in the condition as shown in FIG. 1 is opened so that the printing section 20 is exposed as shown in FIG. 2, the head holder 25 is turned around so that the extension passage 20' is exposed as shown in FIG. 3, the roll 40' of the label tape is stored in the label tape storage 23 as shown in FIG. 4, the head holder is turned downwardly to press the label tape 40 against the platen roller 22 as shown in FIG. 5, and the cover 11 of the casing is closed to finally set the label tape 40 in the label printer.

After the label tape 40 has been properly set, the main switch 34 is turned on to supply the electric circuit 31, printing data is entered using the keyboard 32 and the electric circuit 31 is started by turning on the start switch 321.

As a result of the above procedure, the electric circuit 31 begins to rotate the platen roller 22 and forwards the label tape 40 and simultaneously performs printing on label 41. In this case, the position of label 41 on the thermal printing head 21 is detected by the label position detector 24 and the drive means of said platen roller 22 is controlled by the detection signal transferred from the label position detector 24 to the electric circuit 31.

The label printer in accordance with the present invention is such that the label tape 40 can be very easily loaded in the label printer only by opening the cover 11 and the head holder 25 to expose the entire extension passage 20', setting the roll 40' of the label tape in the label tape storage 23, drawing out the leading part of label tape 40 through the platen roller 22 and closing the head holder 25 and the cover 11. Moreover, the label printer of the present invention has an effect of facilitating detection of a cause of failure and elimination of a cause of failure since the label tape 40 and the extension passage 20' can be exposed so as to be visible from outside by opening the cover 11 and the head holder 25 when a failure occurs.

Other embodiments and modifications of the invention will suggest themselves to those skilled in the art, and all such of these as come within the spirit of this invention are included within its scope as best defined by the appended claims.

What is claimed is:

1. A label printer comprising:

a drive section having a front panel thereover and an electric control and operating circuit therein, said front panel having input means operatively associated with said electric circuit for entering printing data into said electric control and operating circuit;

a printing section adjacent said drive section and having an upwardly open label tape extension passage there-within with an upwardly open label tape storage recess at one end thereof for storing a roll of label tape and an upwardly exposed platen roller at another end thereof and an upwardly exposed label position detector for detecting a position of a label on the label tape and positioned along said label tape extension passage between said label tape storage recess and said platen roller and electrically connected to said electric control and operating circuit, platen roller drive apparatus connected to said platen roller and to which said electric control and operating circuit is electrically connected;

a head holder pivotally mounted along one side of said label tape extension passage adjacent said platen roller for pivoting movement from a position over said platen roller at least 90 degrees;

a thermal printing head on said head holder opposing said platen roller when said head holder is in position over said platen roller for bringing said printing head in contact with said platen roller under pressure, said thermal printing head being moved away from said platen roller by pivoting movement of said head holder to expose said label tape extension passage, said thermal printing head being electrically connected to said electric control and operating circuit, and an openable cover pivotally mounted along a side of said label tape extension passage for pivotal movement independent of said head holder from a position over said label tape extension passage at least 90 degrees for exposing an entire length of said label tape extension passage;

whereby said electric control and operating circuit, in response to printing data entered thereinto, controls said thermal printing head for printing required information on labels on the label tape, and in response to a detection signal from said label position detector, drives said platen roller drive apparatus for positioning a label relative to said printing head, and further drives said platen roller drive apparatus for forwarding the label tape with a printed label thereon, and when said openable cover and said head holder are pivoted through at least 90 degrees, said label tape extension passage is fully exposed along a whole length thereof.

2. A label printer as claimed in claim 1 in which said printing section has a shaft along one side of said label tape extension path, and both said openable cover and said head holder are pivotally mounted on said shaft.

3. A label printer as claimed in claim 1 in which said drive section and said printing section are positioned side by side in a horizontal direction, and said head holder and said openable cover are pivoted on a side of said printing section adjacent said drive section.

4. A label printer as claimed in claim 1 in which said drive section and said printing section are positioned side by side in a horizontal direction, and said head holder and said openable cover are pivoted on a side of said printing section remote from said drive section.

5. A label printer as claimed in claim 1 further comprising a compensation switch on the assembly of said thermal printing head and said head holder and electrically connected to said electric control and operating circuit for being turned on when said thermal printing head comes into contact with said platen roller under pressure to supply a signal to said electric control and operating circuit.

6. A label printer as claimed in claim 5 in which said compensation switch is on said head holder on a side thereof adjacent the pivotal mounting thereof.

7. A label printer as claimed in claim 1 further comprising a lock means for locking said head holder to said printing section when said thermal printing head is in contact with said platen roller.

8. A label printer as claimed in claim 7 in which said lock means comprises a hook on said printing section and a slidable lock piece on said head holder slidably engagable with and disengagable from said hook.

9. A label printer as claimed in claim 1 further comprising a spring between said head holder and said thermal printing head for urging said thermal printing head against said platen roller with a constant pressure.

10. A label printer as claimed in claim 1 in which said label position detector comprises a photoelectric conversion element for detecting optical marks on a rear surface of a carrier strip of the label tape.

11. A label printer as claimed in claim 1 in which said platen roller drive apparatus is a stepping motor.

* * * * *